United States Patent [19]

Maly

[11] 4,194,566

[45] Mar. 25, 1980

[54] METHOD OF INCREASING THE PERMEABILITY OF SUBTERRANEAN RESERVOIRS

[75] Inventor: George P. Maly, Newport Beach, Calif.

[73] Assignee: Union Oil Company of California, Brea, Calif.

[21] Appl. No.: 954,993

[22] Filed: Oct. 26, 1978

[51] Int. Cl.² .................. E21B 43/26; E21B 43/27
[52] U.S. Cl. ............................... 166/307; 166/308; 166/193
[58] Field of Search ............... 166/284, 307, 308, 281, 166/193

[56] References Cited

U.S. PATENT DOCUMENTS

| | | | |
|---|---|---|---|
| 2,186,349 | 1/1940 | Simmons | 166/307 |
| 2,796,130 | 6/1957 | Huber | 166/307 X |
| 2,973,035 | 2/1961 | Brown | 166/307 X |
| 3,028,914 | 4/1962 | Flickinger | 166/284 |
| 3,219,113 | 11/1965 | Ward | 166/308 |
| 3,289,762 | 12/1966 | Schell et al. | 166/281 |
| 3,299,955 | 1/1967 | Page, Jr. | 166/307 |
| 3,547,197 | 12/1970 | Chevalier et al. | 166/284 |
| 3,547,198 | 12/1970 | Slusser | 166/284 |

OTHER PUBLICATIONS

Kimmel, J. W., "A New Deep Gas Well Design which Permits Use of the Most Advanced Completion Techniques," 18th Annual Southwest Short Course Assoc. Meeting Proceedings, pp. 15–26, (1971).

*Primary Examiner*—Stephen J. Novosad
*Attorney, Agent, or Firm*—Dean Sandford; Gerald L. Floyd

[57] ABSTRACT

A method of acidizing and/or fracturing a subterranean reservoir with a minimum of damage to the reservoir by the displacement fluid used to displace the acidizing or fracturing fluid into the reservoir and by the fluid used to kill the well wherein a restriction means having a seat for a closure means is located in a well conduit above a point of fluid entry into the reservoir, a slug of acidizing and/or fracturing fluid is injected into the reservoir, a slug of displacement fluid containing the closure means is injected down the well conduit, and a slug of weighted kill fluid is injected down the well conduit, said injection continuing until the closure means seats in the seat.

20 Claims, 4 Drawing Figures

METHOD OF INCREASING THE PERMEABILITY OF SUBTERRANEAN RESERVOIRS

BACKGROUND OF THE INVENTION (1) Field of the Invention

This invention relates to a method for increasing the permeability of a petroleum-containing subterranean reservoir penetrated by a well. More particularly, the invention relates to a method of acidizing or fracturing such a reservoir with reduced damage to the reservoir by the displacement fluid used to displace the acidizing or fracturing fluid into the reservoir and by the fluid used to kill the well.

(2) Description of the Prior Art

Many wells are completed in relatively low permeability petroleum-containing reservoirs made up at least partially of acid-soluble components. In order to increase the permeability of the reservoir surrounding such wells, which permeability can be further decreased by having come in contact with drilling fluids during the drilling operation, so that petroleum can be more easily produced therefrom or an enhanced recovery fluid can be more easily injected therein, it is common practice to acidize and/or acid fracture the reservoir. In such processes, an acid solution is injected down a well conduit and out into the reservoir. After the desired amount of acid solution has been introduced into the well, it is followed by a slug of displacement fluid which displaces the last portion of acid solution remaining in the well conduit out into the reservoir. Since the reservoir can contain fluids at a high pressure, it is usually necessary to follow the slug of displacement fluid with a weighted fluid to occupy the well conduit and balance the reservoir pressure. Such a procedure is referred to as killing the well. When the well is in this condition, it is common practice to shut it in for a period of time to enable it to be prepared either for production of well fluids or for injection of an enhanced recovery displacement fluid. This preparation can include running tubing into the well, setting a packer, installing a christmas tree and other surface fluid handling equipment and the like. During these preparations, there is a tendency for the column of displacement fluid and kill fluid in the well to leak away into the reservoir since the weight of the column of fluid in the well conduit is greater than the reservoir pressure. Thus, the voids in the newly acidized and/or fractured reservoir are invaded by displacement fluid and kill fluid. When the well is subsequently put on production or injection, this displacement fluid and kill fluid can cause at least some blockage and plugging of the reservoir permeability and at least partially offset the permeability-increasing effects of the acidizing/fracturing operation. This is especially true in the case of the kill fluid which is generally a weighted aqueous drilling mud composition. This drilling mud exhibits considerable gel strength. While the well is shut in, the drilling mud becomes stagnate, tends to gel, can loose moisture and form a mass of partially dry solids, and becomes quite resistant to subsequent movement when the well is put in service.

Similar problems of reservoir permeability damage caused by invasion of a reservoir by displacement fluid and kill fluid exist where wells are hydraulically fractured using nonacid fracturing fluids such as fresh water, brine or oil.

It is known to restrict the flow of fluid from a wellbore into a reservoir for a period of time during various well operations by injecting into the well a ball or plug which lodges downhole in a seat, baffle or perforation and either stops further fluid flow through the wellbore or diverts the flow to an alternate route. The ball or plug can be subsequently removed. U.S. Pat. No. 3,547,197 to Chevalier et al. describes a method of acidizing a perforated well comprising:

(a) injecting a first slug of an acidizing solution,
(b) injecting a slug of water to displace the acidizing solution out into the reservoir,
(c) injecting a slug of water containing a number of sealer balls to lodge in and seal the more permeable perforations, and
(d) injecting a second slug of the acidizing solution which will invade the less permeable portions of the reservoir.

U.S. Pat. No. 3,289,762 to Schell et al. shows a method of fracturing both an upper formation and a lower formation penetrated by a well comprising:

(a) running into the well a tubing string with a baffle placed in the string at a position between the upper and lower formations,
(b) cementing the tubing in place,
(c) perforating and fracturing the lower formation,
(d) pumping down the tubing a ball or plug which lodges in the baffle,
(e) perforating and fracturing the upper formation, and
(f) producing the well, thus, floating the ball out of the tubing.

U.S. Pat. No. 2,796,130 to Huber discloses an apparatus for depositing in and removing from a well containing casing and tubing a cement slurry or a gelled acid treating agent. A valve seat is positioned in an extension conduit below the tubing. As part of the operation of the apparatus, a ball is dropped through the tubing to seat in the valve seat after the cement slurry or gelled acid is injected. The extension conduit then drops down, as from above well perforations to below the perforations. Excess cement slurry or gelled acid treating agent is then reverse circulated out of the annulus surrounding the extension conduit. After the treatment is complete, the extension conduit and ball are pulled from the well by a wire line to open up the tubing.

Thus, while various well treatments are known in which balls are dropped to temporarily stop the flow of fluid down a wellbore, it has not been previously known to employ such a technique during a well acidizing or fracturing operation in a manner so as to prevent the displacement fluid and kill fluid injected following the acidizing or fracturing fluid from invading and adversely reducing the reservoir permeability.

Accordingly, a principal object of this invention is to provide a method for acidizing and/or fracturing a hydrocarbon-containing subterranean reservoir.

A further object is to provide such a method wherein contamination of the so-treated reservoir by the fluid used to displace the acidizing or fracturing fluid out of the wellbore and into the reservoir and the kill fluid is reduced.

A still further object is to provide such a method wherein the permeability of the so-treated reservoir is not decreased by invasion of displacement fluid and kill fluid.

Another object is to provide such a method wherein the reservoir permeability is not decreased during subsequent preparation of the well for production or injection.

Yet another object is to provide a method for killing a well following an acidizing or fracturing treatment.

Other objects, advantages and features will be apparent from the following description and drawings.

SUMMARY OF THE INVENTION

In brief the invention involves a method for acidizing and/or fracturing a hydrocarbon-containing subterranean reservoir penetrated by a well, said reservoir having reduced reduction in permeability following the acidizing and/or fracturing treatment due to invasion thereof by displacement fluid injected into the wellbore to displace the acidizing or fracturing fluid out of the wellbore into the reservoir and by kill fluid.

There is located in a well conduit above a point of fluid entry into the reservoir, preferably immediately superjacent, a restriction means having therein a seat for a closure means. A slug of an acidizing or fracturing fluid is injected into the reservoir via the well conduit followed first by a slug of a displacement fluid to displace the acidizing or fracturing fluid out of the well conduit and out into the reservoir, the displacement fluid containing a closure means adapted to seat in the seat of said restriction means, and next by a slug of a weighted kill fluid to balance the reservoir pressure. When the closure means seats in the seat, the injection of kill fluid is terminated and the well is prepared for further service. Subsequently, the kill fluid is removed from the well and the well is returned to service.

BRIEF DESCRIPTION OF THE DRAWINGS

The invention will be more readily understood by reference to the accompanying drawings, in which.

DESCRIPTION OF THE PREFERRED EMBODIMENTS

Figure 1:
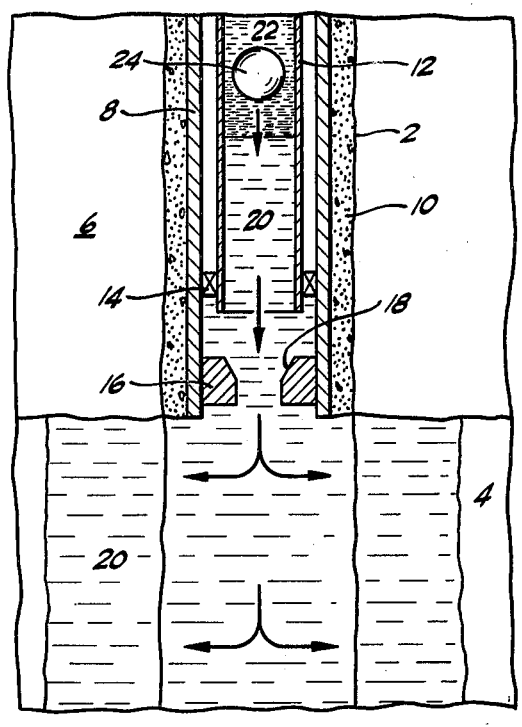
FIG. 1 is a vertical cross section of a subterranean earth formation penetrated by a well and schematically illustrating the step of acidizing and/or fracturing the reservoir surrounding the well.

Referring now to FIG. 1, recently drilled well 2 is completed in hydrocarbon-containing reservoir 4 which is overlain by nonhydrocarbon-containing earth formation 6. Well 2 is equipped with casing 8 cemented in place with annular cement sheath 10, drill string 12 and packer 14. Flow restriction means 16, such as a ball check valve seat, seating nipple, landing nipple, landing collar, or some other means containing upward facing seat 18 is provided near the lower end of casing 8. Acidizing or fracturing fluid 20 is shown as having penetrated into hydrocarbon-containing reservoir 4 to some extent. Displacement fluid 22 has partially displaced acidizing or fracturing fluid 20 out of casing 8. Displacement fluid 22 contains closure means 24, such as a ball or plug, adapted to seat in seat 18 of flow restriction means 16.

Figure 2:
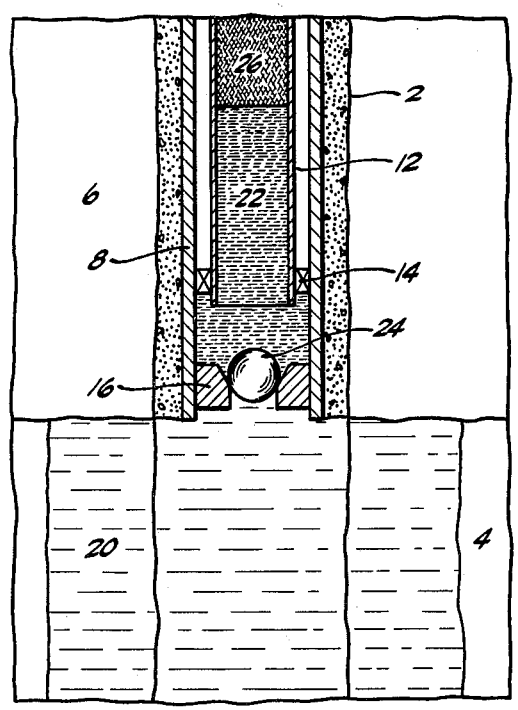
FIG. 2 is a similar vertical cross sectional view showing the well after the acidizing or fracturing fluid has been displaced by the displacement fluid out of the well and into the reservoir and a kill fluid has been injected into the well.

As shown in FIG. 2, displacement fluid 22 has displaced acidizing or fracturing fluid 20 out of casing 8 and closure means 24 has seated in flow restriction means 16. Kill fluid 26 has been injected after displacement fluid 22. The reservoir permeability increasing operation is now complete.

Figure 3:
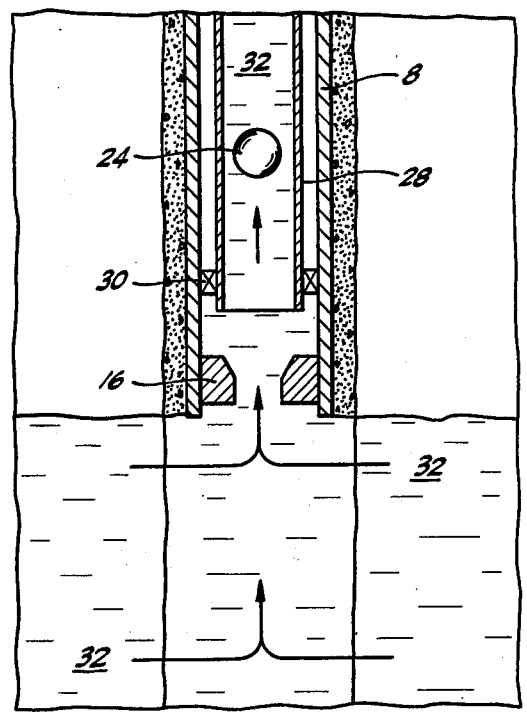
FIG. 3 is a similar vertical cross sectional view showing one method of removing the closure means following preparation of the well for service.

In FIG. 3, drill string 12 and packer 14 have been removed from well 2 and tubing 28 has been run. Packer 30 has been positioned in the annular space between casing 8 and tubing 28 near the lower end of tubing 28. During this operation none of displacement fluid 22 or kill fluid 26 has invaded formation 4 because of the presence of closure means 24 seated in flow restriction means 16. Kill fluid 26 has been removed from well 2 which has been placed on production with production fluids 32 lifting closure means 24 off of seat 18. Closure means 24 is shown passing up tubing 28 and is removed therefrom at the top of the well (not shown).

Figure 4:
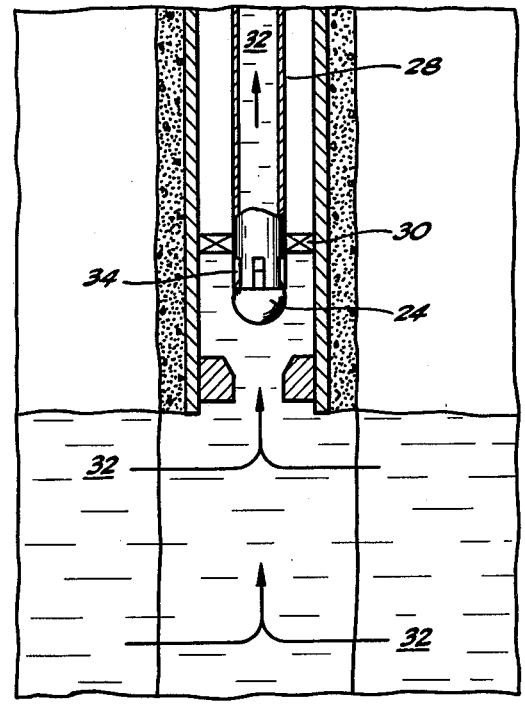
FIG. 4 is a similar vertical cross sectional view showing an alternative method for placing the well in production following the acidizing and/or fracturing treatment.

FIG. 4 shows an alternate embodiment in which closure means 24 is too large to pass up tubing 28. Instead, closure means 24 lodges in the lower end of tubing 28 which is equipped with slots or notches 34 near the lower end thereof to allow produced fluids to pass therethrough and up tubing 28. In a still further embodiment, closure means 24 may be made of a material which is soluble in the fluids with which it comes in contact downhole, or is made of a material, such as magnesium, which is acid-soluble. In such an instance, a small slug of acid solution is spotted in the well with a wire line bailer into contact with closure means 24 until closure means 24 is dissolved. In yet another embodiment, either closure means 24 or upward facing seat 18 is made of a crushable material. When substantial downward pressure is applied on the fluids in well conduit 8, either closure means 24 or upward facing seat 18 crush, thus, opening well conduit 8 to fluid passage.

The restriction means is positioned in the well conduit above the point of entry of fluid into the reservoir, preferably immediately superjacent this point. The restriction means can be run into the well as part of the casing or run into the casing after the casing is positioned in the well. The well can be open hole completion as shown in FIGS. 1 to 4 or perforated casing can extend over the reservoir.

The method of this invention can be used in any reservoir susceptible to acidizing or hydraulic fracturing. It is particularly useful in treating with an acid solution a reservoir made up of or containing either carbonates, such as limestone or dolomite, which are soluble in various acids or silica which is soluble in hydrofluoric acid.

The method of the invention can be employed in both oil-containing and gas-containing petroleum reservoirs. The method is especially useful in gas-containing reservoirs. Such reservoirs are often drilled at least partially with a gas-containing aqueous drilling fluid to minimize the permeability damaging invasion of the reservoir by the drilling fluid. Thus, such reservoirs contain a minimum of liquid when subjected to acidizing and/or fracturing and are highly susceptible to invasion by fluids following such treatment. The method is particularly useful in such reservoirs which are acidized and/or fractured by a gas-containing acid solution.

Any of the wide variety of acid solutions previously used in well acidizing and/or fracturing operations can be used in the method of this invention. Included are the mineral acids, especially hydrochloric acid, carboxylic acids such as acetic acid, formic acid, citric acid and tartaric acid, the so-called clay acids which contain hydrochloric acid plus hydrofluoric acid or a compound such as ammonium bifluoride, or the like which yields the fluoride ion in solution, and the soluble salts of the aforementioned acids. The acidizing and/or fracturing acid solutions may also contain other well known ingredients such as corrosion inhibitors, surface active agents, demulsifiers, solid particulate propping agents, friction reducing agents and the like. In fracturing operations, the acid solution may be preceded by a slug of water or brine with or without a thickener as a breakdown fluid.

The displacement fluid used to displace the acid solution from the well conduit and out into the reservoir can be an oil, for example crude oil or a refined oil, or an aqueous medium such as fresh water or brine.

The kill fluid can be an aqueous drilling mud which contains, in addition to the usual ingredients, a weighting agent, the amount of which varies according to the reservoir pressure which must be balanced. The weighted drilling fluid generally has a weight of about 10 to 18 pounds per gallon or above.

When the well is otherwise ready to be placed in service, it is necessary to remove the kill fluid from the well conduit. This can be done by various means such as swabbing it out, displacing it with nitrogen or some other suitable gas or circulating it out with diesel fuel or some other suitable clean liquid.

The relative amounts of acidizing or fracturing fluid, displacement fluid and kill fluid used in the method of this invention can vary widely depending upon a number of factors including: the nature of the reservoir; the depth of the reservoir; the depth of penetration of the acid solution into the reservoir desired; and the like. Generally there are used from about 1,000 to 200,000 gallons of acidizing or fracturing fluid from about 1,000 to 200,000 gallons of displacement fluid and about 1 to 2 hole volumes of kill fluid.

The invention is further described by the following example which is illustrative of a specific mode of practicing the invention as defined by the appended claims.

EXAMPLE

A well is completed in a deep gas-containing limestone reservoir of known low permeability. The well is provided with casing perforated over the interval of 21,010 feet to 21,090 feet and a 4 inch diameter drill string extending to a depth of 21,000 feet. A packer is positioned in the annular space between the casing and the drill string near the lower end of the drill string. The casing contains a one way check valve seat at a depth of 21,000 feet. An acid fracturing operation is carried out sequentially as follows. The aqueous mud used in drilling the well is reverse circulated out of the well and displaced with a clean filtered field brine. 100,000 gallons of clean filtered field brine containing 200 cubic feet of nitrogen is injected as a precooling pad at a pressure of 10,000 p.s.i. to initiate a fracture. 80,000 gallons of an aqueous solution containing 28 percent by weight hydrochloric acid and 500 cubic feet of nitrogen is injected at a pressure of 10,000 p.s.i. to extend the fracture. 10,000 gallons of clean filtered field brine containing 500 cubic feet of nitrogen is injected as a displacement fluid to displace the acid solution from the casing, a 3.9 inch diameter ball adapted to seat in the check valve seat is lubricated into the displacement fluid after 9,900 gallons of the same has been injected. A casing volume of an aqueous base drilling mud having a weight of 11 pounds per gallon, the weight necessary to hold the well under control, is injected as a kill fluid at a high rate of 20 barrels per minute. Pumping of the kill fluid is stopped when a sharp pressure rise indicates that the ball has seated. The well is completed by pulling the drill string and packer replacing the same with a string of 4 inch diameter production tubing and another similarly-positioned packer, and installing a christmas tree and other fluid handling equipment at the surface. The kill fluid is then swabbed from the tubing and the well placed on production. The ball unseats, is produced up the tubing, caught in a catcher and removed from the well. A good gas production rate indicates that the fracturing operation is successful and the reservoir is not contaminated by completion fluid or kill fluid.

While particular embodiments of the invention have been described, it will be understood, of course, that the invention is not limited thereto since many modifications can be made and it is intended to include within the invention such modifications as are within the scope of the claims.

The invention having thus been described, I claim:

1. A method for acidizing and/or fracturing a hydrocarbon-containing subterranean reservoir penetrated by a well comprising:
    (a) locating in a well conduit above a point of fluid entry into the reservoir a restriction means having therein a seat for a closure means;
    (b) injecting into the reservoir via the well conduit a slug of an acidizing or fracturing fluid;
    (c) injecting into the well conduit a slug of a displacement fluid containing a closure means adapted to fit into the seat of said restriction means;
    (d) injecting into the well conduit a slug of a weighted aqueous kill fluid;
    (e) continuing the injection of the slug of kill fluid until the closure means seats in the seat; and
    (f) preparing the well for further service.

2. The method defined in claim 1 wherein the restriction means is positioned in the well conduit at a point immediately superjacent the point of fluid entry into the reservoir.

3. The method defined in claim 1 wherein the hydrocarbon containing subterranean reservoir is a gas-containing reservoir.

4. The method defined in claim 1 wherein the hydrocarbon-containing subterranean reservoir is an oil-containing reservoir.

5. The method defined in claim 1 wherein subterranean reservoir contains an acid-soluble component.

6. The method defined in claim 1 wherein the acidizing or fracturing fluid is an aqueous solution of an acid or an acid-forming salt selected from the group consisting of mineral acids and carboxylic acids and their salts.

7. The method defined in claim 6 wherein the acid solution is an aqueous solution containing hydrochloric acid.

8. The method defined in claim 1 wherein the displacement fluid is an aqueous solution selected from the group consisting of fresh water and brine.

9. The method defined in claim 1 wherein the kill fluid is a drilling mud.

10. The method defined in claim 1 wherein the restriction means forms a part of the casing as the casing is run into the well.

11. The method defined in claim 1 wherein the restriction means is run into the casing and affixed thereto after the casing is positioned in the well.

12. The method defined in claim 1 wherein the restriction means is a check valve seat.

13. The method defined in claim 1 wherein the restriction means is a seating nipple.

14. The method defined in claim 1 wherein the restriction means is a landing nipple or landing collar.

15. The method defined in claim 1 wherein the restriction means is a packer.

16. The method defined in claim 1 wherein the closure means is subsequently displaced from the seat of the restriction means and the well is placed on production or injection.

17. The method defined in claim 16 wherein the preparing of the well for further service of step (f) includes the step of placing tubing in the well and the closure means is displaced from the seat of the restriction means by placing the well on production and producing the closure means up the tubing.

18. The method defined in claim 16 wherein the preparing of the well for further service of step (f) includes the step of placing tubing in the well, said tubing having slots in the lower end thereof, and the closure means is displaced from the seat of the restriction means by placing the well on production.

19. The method of claim 16 wherein the closure means is dissolved or crushed.

20. A method for acid fracturing with an acid solution followed by a displacement fluid a gas-containing subterranean reservoir containing acid-soluble components and penetrated by a cased well comprising:
 (a) locating in the casing at a point above a point of fluid entry into the well a restriction means having therein an upwardly facing one-way seat for a closure means;
 (b) injecting into the reservoir via the well a slug of an acid solution at a pressure and injection rate sufficient to hydraulically fracture the reservoir;
 (c) injecting into the casing a slug of displacement fluid containing a closure means adapted to seat in the seat of restriction means,
 (d) injecting into the casing a slug of a weighted aqueous drilling mud kill fluid;
 (e) continuing the injection of the slug of kill fluid until the closure means seats in the seat;
 (f) preparing the well for production; and
 (g) displacing the closure means from the seat.

* * * * *